(12) United States Patent
Nguyen et al.

(10) Patent No.: US 8,863,842 B2
(45) Date of Patent: Oct. 21, 2014

(54) METHODS FOR PROPPING FRACTURES USING PROPPANT-LADEN AGGREGATES AND SHEAR-THICKENING FLUIDS

(75) Inventors: Philip D. Nguyen, Houston, TX (US); Jeff T. Fleming, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/595,132

(22) Filed: Aug. 27, 2012

(65) Prior Publication Data

US 2014/0054035 A1 Feb. 27, 2014

(51) Int. Cl.
*E21B 43/267* (2006.01)
(52) U.S. Cl.
USPC .................. 166/308.1; 166/308.2; 166/280.2
(58) Field of Classification Search
None
See application file for complete search history.

(56) References Cited

U.S. PATENT DOCUMENTS

| | | | | |
|---|---|---|---|---|
| 4,585,064 | A * | 4/1986 | Graham et al. | 166/280.2 |
| 4,670,501 | A * | 6/1987 | Dymond et al. | 524/458 |
| 5,076,359 | A * | 12/1991 | Yeh | 166/278 |
| 5,249,627 | A | 10/1993 | Harms et al. | |
| 5,833,000 | A | 11/1998 | Weaver et al. | |
| 5,839,510 | A | 11/1998 | Weaver et al. | |
| 5,853,048 | A | 12/1998 | Weaver et al. | |
| 6,287,639 | B1 | 9/2001 | Schmidt et al. | |
| 6,311,773 | B1 | 11/2001 | Todd et al. | |
| 6,439,309 | B1 | 8/2002 | Matherly et al. | |
| 6,488,091 | B1 * | 12/2002 | Weaver et al. | 166/300 |
| 6,582,819 | B2 | 6/2003 | McDaniel et al. | |
| 6,677,426 | B2 | 1/2004 | Noro et al. | |
| 6,831,108 | B2 * | 12/2004 | Dahanayake et al. | 516/69 |
| 7,153,575 | B2 | 12/2006 | Anderson et al. | |
| 7,345,011 | B2 * | 3/2008 | Nguyen et al. | 507/220 |
| 7,392,847 | B2 | 7/2008 | Gatlin et al. | |
| 7,673,686 | B2 | 3/2010 | Nguyen et al. | |
| 7,819,192 | B2 | 10/2010 | Weaver et al. | |
| 7,825,074 | B2 | 11/2010 | Schmidt et al. | |
| 7,956,017 | B2 | 6/2011 | Gatlin et al. | |
| 8,003,579 | B2 | 8/2011 | Akarsu et al. | |
| 2005/0274517 | A1 | 12/2005 | Blauch et al. | |
| 2005/0277554 | A1 | 12/2005 | Blauch et al. | |
| 2006/0113078 | A1 * | 6/2006 | Nguyen et al. | 166/280.2 |
| 2007/0131422 | A1 | 6/2007 | Gatlin et al. | |
| 2007/0131425 | A1 | 6/2007 | Gatlin et al. | |
| 2007/0289781 | A1 | 12/2007 | Rickman et al. | |
| 2008/0006405 | A1 | 1/2008 | Rickman et al. | |
| 2010/0071893 | A1 * | 3/2010 | Caritey et al. | 166/246 |
| 2010/0089581 | A1 * | 4/2010 | Nguyen et al. | 166/280.2 |
| 2010/0160187 | A1 | 6/2010 | Nguyen et al. | |
| 2010/0179281 | A1 | 7/2010 | Nilsen | |
| 2010/0212898 | A1 | 8/2010 | Nguyen et al. | |
| 2010/0280210 | A1 | 11/2010 | Kitamura et al. | |
| 2011/0030950 | A1 | 2/2011 | Weaver et al. | |
| 2011/0039737 | A1 | 2/2011 | Schmidt et al. | |
| 2011/0067868 | A1 | 3/2011 | Le Roy-Delage et al. | |
| 2011/0094737 | A1 * | 4/2011 | Chen et al. | 166/268 |
| 2011/0098394 | A1 | 4/2011 | Schmeltzer et al. | |

* cited by examiner

*Primary Examiner* — Zakiya W Bates
*Assistant Examiner* — Silvana Runyan
(74) *Attorney, Agent, or Firm* — McDermott Will & Emery LLP; Craig W. Roddy

(57) ABSTRACT

Methods comprising first introducing a solids-free fracturing fluid into a subterranean formation at a rate sufficient to enhance or create at least one fracture therein. Once a fracture is created or enhanced, a treatment fluid comprising a carrier fluid and a shear-thickening fluid is placed into the fracture. The shear-thickening fluid comprises a propping material selected from the group consisting of: proppant, proppant aggregates, solids free gel bodies, and combinations thereof. The propping material forms a bed within the fracture. In some embodiments, solids-free gel bodies may also be included in the treatment fluid.

14 Claims, No Drawings

METHODS FOR PROPPING FRACTURES USING PROPPANT-LADEN AGGREGATES AND SHEAR-THICKENING FLUIDS

BACKGROUND

The present invention relates to methods for forming pillars and proppant-free channels in propped fractures.

Subterranean wells (e.g., hydrocarbon producing wells, water producing wells, and injection wells) are often stimulated by hydraulic fracturing treatments. In hydraulic fracturing treatments, a viscous fracturing fluid is pumped into a portion of a subterranean formation at a rate and pressure such that the subterranean formation breaks down and one or more fractures are formed. Typically, particulate solids, such as graded sand, bauxite, ceramics, or even nut hulls, are suspended in a treatment fluid and then deposited in the fractures. These particulate solids, or proppant particulates, are generally deposited in the fracture in a concentration such that they form a tight pack of particulates, or "proppant aggregates," which serve to prevent the fractures from fully closing once the hydraulic pressure is removed. As used herein, the term "proppant aggregate(s)" refers to a coherent body, such that when the aggregate is placed into the fracture(s) or into a fracturing or treatment fluid, the aggregate should not become dispersed into smaller bodies without the application of shear. By keeping the fracture from fully closing, the proppant particulates aid in forming conductive paths through which fluids may flow.

An alternative fracturing approach involves placing a reduced volume of proppant particulates into a fracture by forming consolidated, proppant aggregates which can create a propped fracture having high porosity, permeability, and/or conductivity. Proppant aggregates tightly pack and abut the face of the fracture to create proppant pillars when the fracture closes after the hydraulic pressure is removed. Typically, proppant aggregates do not become dispersed into smaller bodies without the application of shear. However, during fracturing operations, proppant aggregates may experience shear force or stress that can cause the proppant aggregates to disperse into smaller bodies. If these small bodies do not re-form into aggregates, they may not be of sufficient size to prop open a fracture. In some cases, partial fracture closure may result if the proppant aggregates do not remain a coherent body.

One way to compensate for the potential of proppant aggregate dispersion due to downhole shear force or stress is to pump the proppant aggregates into the fracture in viscous gel treatment fluids. While gel treatment fluids afford some protection to the proppant aggregates from dispersion, treatment fluids are typically shear-thinning fluids. As a result, when the treatment fluid encounters downhole shear force or stress (e.g. high impact areas during injection, elbows, perforations, and the like), the fluid's viscosity decreases, thus the protection afforded to the proppant aggregates also decreases. Therefore, the shear-thinning property of most treatment fluids only provides protection to proppant aggregates when the fracturing operation will cause the treatment fluid to experience only trivial amounts of shear force or stress. However, in typical fracturing operations, the treatment fluid will experience greater than trivial shear force or stress, which may result in proppant aggregate dispersion and compromised fracture conductivity.

The degree of success of a fracturing operation depends, at least in part, upon fracture conductivity once the fracturing operation has ceased and production commenced. Therefore, a practical method of reducing proppant aggregate dispersion during fracturing operations may be of value to one of ordinary skill in the art.

SUMMARY OF THE INVENTION

The present invention relates to methods for forming pillars and proppant-free channels in propped fractures.

In some embodiments, the present invention provides a method comprising introducing a first fracturing fluid comprising a solids-free fluid into a subterranean formation at a rate sufficient to enhance or create at least one fracture therein; introducing a second fracturing fluid comprising a degradable shear-thinning carrier fluid and a treatment fluid, wherein the treatment fluid comprises a shear-thickening fluid and proppant aggregates comprising proppant particulates, at a rate sufficient to extend the fracture; and allowing the degradable shear-thinning carrier fluid to degrade.

In other embodiments, the present invention provides a method comprising introducing a first fracturing fluid comprising a solids-free fluid into a subterranean formation at a rate sufficient to enhance or create at least one fracture therein; introducing a second fracturing fluid comprising a degradable shear-thinning carrier fluid, degradable solids-free gel bodies, and a treatment fluid, wherein the treatment fluid comprises a shear-thickening fluid and proppant aggregates comprising proppant particulates, at a rate sufficient to extend the fracture; and allowing the degradable shear-thinning carrier fluid and degradable solids-free gel bodies to degrade.

The features and advantages of the present invention will be readily apparent to those skilled in the art upon a reading of the description of the preferred embodiments that follows.

DETAILED DESCRIPTION

The present invention relates to methods for forming pillars and proppant-free channels in propped fractures.

The methods described herein employ a shear-thickening fluid used in combination with a carrier fluid to reduce dispersion of proppant aggregates during fracturing operations. While a shear-thickening fluid is used to control the movement of the proppant within the carrier fluid, the carrier fluid itself is generally shear-thinning. As used herein, the term "shear-thinning fluid" refers to a fluid in which viscosity decreases with the rate of shear strain. By contrast, "shear-thickening fluid" refers to a fluid in which viscosity increases with the rate of shear strain.

In one embodiment, the present invention provides a method comprising introducing a solids-free fracturing fluid into a subterranean formation at a rate sufficient to enhance or create at least one fracture therein. Next, a treatment fluid comprising a carrier fluid and a shear-thickening fluid is placed into at least a portion of the fracture within the subterranean formation. In some embodiments, the shear-thickening fluid may comprise proppant aggregates, while in other embodiments the shear-thickening fluid comprises traditional proppant particulates. Also, in some embodiments the carrier fluid may further comprise proppant-free gel bodies, while in other embodiments solids-free gel bodies may be included in the shear-thickening fluid. The shear-thickening fluid helps maintain the integrity of the proppant aggregates or the proppant itself to ensure that the chosen proppant remains together and able to form a suitable propping bed. That is, as the treatment fluid is placed under shear, the carrier fluid may thin to allow for easier placement and less energy use, while the shear-thickening fluid will viscosify in order to better transport the proppant or proppant aggregates.

According to some embodiments of the present invention, a fracturing system may be used to create or enhance at least one fracture in a subterranean formation. In these embodiments, any fluid suitable for a fracturing or frac-packing application may be used in accordance with the teachings of the present invention as a fracturing fluid, including aqueous gels, viscoelastic surfactant gels, oil gels, foamed gels, emulsions, and any combination thereof. Suitable aqueous gels are generally comprised of water and one or more gelling agents. Suitable emulsions can be comprised of two immiscible liquids such as an aqueous liquid or gelled liquid and a hydrocarbon. Foams can be created by the addition of a gas, such as carbon dioxide or nitrogen. In some embodiments of the present invention, the fracturing fluids are aqueous gels comprised of water, a gelling agent for gelling the water and increasing its viscosity, and, optionally, a crosslinking agent for crosslinking the gel and further increasing the viscosity of the fluid. The water used to form the fracturing fluid may be salt water, brine, or any other aqueous liquid that does not adversely react with the other components. The density of the water can be increased to provide additional transport and suspension in the present invention.

A variety of gelling agents may be used, including hydratable polymers that contain one or more functional groups such as hydroxyl, carboxyl, sulfate, sulfonate, amino, or amide groups. Suitable gelling agents typically comprise polymers, synthetic polymers, or a combination thereof. A variety of gelling agents can be used in conjunction with the methods and compositions of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. In certain embodiments, the gelling agents may be polymers comprising polysaccharides, and derivatives thereof that contain one or more of these monosaccharide units: galactose, mannose, glucoside, glucose, xylose, arabinose, fructose, glucuronic acid, or pyranosyl sulfate. Examples of suitable polymers include, but are not limited to, guar gum and derivatives thereof, such as hydroxypropyl guar and carboxymethylhydroxypropyl guar, and cellulose derivatives, such as hydroxyethyl cellulose. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091 issued to Weaver, et al., the entire disclosure of which is incorporated herein by reference. Suitable gelling agents generally are present in the fracturing fluids of the present invention in an amount in the range of from about 0.1% to about 5% by weight of the water therein. In certain embodiments, the gelling agents are present in the treatment fluids of the present invention in an amount in the range of from about 0.01% to about 2% by weight of the water therein.

Crosslinking agents may be used to crosslink gelling agent molecules to form crosslinked gelling agents. Crosslinkers typically comprise at least one ion that is capable of crosslinking at least two gelling agent molecules. Examples of suitable crosslinkers include, but are not limited to, boric acid, disodium octaborate tetrahydrate, sodium diborate, pentaborates, ulexite and colemanite, compounds that can supply zirconium IV ions (for example, zirconium lactate, zirconium lactate triethanolamine, zirconium carbonate, zirconium acetylacetonate, zirconium malate, zirconium citrate, and zirconium diisopropylamine lactate); compounds that can supply titanium IV ions (for example, titanium lactate, titanium malate, titanium citrate, titanium ammonium lactate, titanium triethanolamine, and titanium acetylacetonate); aluminum compounds (for example, aluminum lactate or aluminum citrate); antimony compounds; chromium compounds; iron compounds; copper compounds; zinc compounds; or a combination thereof. An example of a suitable commercially available zirconium-based crosslinker is "CL-24" available from Halliburton Energy Services, Inc., Duncan, Okla. An example of a suitable commercially available titanium-based crosslinker is "CL-39" available from Halliburton Energy Services, Inc., Duncan, Okla. Suitable crosslinkers generally are present in the fracturing fluids of the present invention in an amount sufficient to provide, in situ, the desired degree of crosslinking between gelling agent molecules. In certain embodiments of the present invention, the crosslinkers may be present in an amount in the range from about 0.001% to about 10% by weight of the water in the treatment fluid. In other embodiments of the present invention, the crosslinkers may be present in the treatment fluids of the present invention in an amount in the range of from about 0.01% to about 1% by weight of the water therein. Individuals skilled in the art, with the benefit of this disclosure, will recognize the exact type and amount of crosslinker to use depending on factors such as the specific gelling agent, desired viscosity, and formation conditions.

The gelled or gelled and cross-linked fracturing fluids may also include internal delayed gel breakers such as enzyme, oxidizing, acid buffer, or temperature-activated gel breakers. The gel breakers cause the fracturing fluids to revert to thin fluids that can be produced back to the surface after they have been used to place the proppant particulates in subterranean fractures. The gel breaker used is typically present in the treatment fluid in an amount in the range of from about 0.5% to about 10% by weight of the gelling agent. The fracturing fluids may also include one or more of a variety of well-known additives, such as gel stabilizers, fluid loss control additives, clay stabilizers, bactericides, and the like.

One of skill in the art will recognize that it is often desirable to reduce the viscosity of the carrier fluid and/or the shear-thickening fluid once the proppant has been placed within the subterranean formation. Such viscosity reduction is known in the art as "breaking" and can be achieved in a variety of ways. One of skill in the art will be able to choose a suitable breaker to achieve the desired result.

Proppant particulates suitable for use in the methods of the present invention may be of any size and shape combination known in the art as suitable for use in a fracturing operation. Generally, where the chosen proppant is substantially spherical, suitable proppant particulates have a size in the range of from about 2 to about 400 mesh, U.S. Sieve Series. In some embodiments of the present invention, the proppant particulates have a size in the range of from about 8 to about 120 mesh, U.S. Sieve Series. A major advantage of using this method is there is no need for the solid particulates to be sieved or screened to a particular or specific particle mesh size or particular particle size distribution, but rather a wide or broad particle size distribution can be used.

In some embodiments of the present invention it may be desirable to use substantially non-spherical proppant particulates. Suitable substantially non-spherical proppant particulates may be cubic, polygonal, fibrous, or any other non-spherical shape. Such substantially non-spherical proppant particulates may be, for example, cubic-shaped, rectangular-shaped, rod-shaped, ellipse-shaped, cone-shaped, pyramid-shaped, or cylinder-shaped. That is, in embodiments wherein the proppant particulates are substantially non-spherical, the aspect ratio of the material may range such that the material is fibrous to such that it is cubic, octagonal, or any other configuration. Substantially non-spherical proppant particulates are generally sized such that the longest axis is from about 0.02 inches to about 0.3 inches in length. In other embodiments, the longest axis is from about 0.05 inches to about 0.2 inches in length. In one embodiment, the substantially non-spherical proppant particulates are cylindrical having an aspect ratio of about 1.5 to 1 and about 0.08 inches in diameter and about 0.12 inches in length. In another embodiment, the substantially non-spherical proppant particulates are cubic having sides about 0.08 inches in length. The use of substantially non-spherical proppant particulates may be desirable in some embodiments of the present invention because, among other things, they may provide a lower rate of settling when slurried into a fluid as is often done to transport proppant particulates to desired locations within subterranean formations. By so resisting settling, substantially non-spherical proppant particulates may provide improved proppant particulate distribution as compared to more spherical proppant particulates.

Proppant particulates suitable for use in the present invention may comprise any material suitable for use in subterranean operations. Suitable materials for these proppant particulates include, but are not limited to, sand (such as beach sand, desert sand, or graded sand), bauxite, ceramic materials, glass materials (such as crushed, disposal glass material), polymer materials (such as EVA or composite materials), polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, lightweight particulates, microsphere plastic beads, ceramic microspheres, glass microspheres, manmade fibers, cements (such as Portland cements), fly ash, carbon black powder, and combinations thereof. Suitable composite particulates may comprise a binder and a filler material wherein suitable filler materials include silica, alumina, fumed carbon, carbon black, graphite, mica, titanium dioxide, barite, meta-silicate, calcium silicate, kaolin, talc, zirconia, boron, fly ash, hollow glass microspheres, solid glass, solids-laden gel bodies, and combinations thereof.

Suitable proppant particulates for use in conjunction with the present invention may be any known shape of material, including substantially spherical materials, fibrous materials, polygonal materials (such as cubic materials), and combinations thereof. Moreover, fibrous materials, that may or may not be used to bear the pressure of a closed fracture, may be included in certain embodiments of the present invention.

In some embodiments, the proppant particulates are solids-laden gel bodies. In these embodiments, the solid-laden gel bodies, tend to form aggregates when placed into a subterranean formation, such that once the gelled carrier fluid is removed, what remains are multiple, separate clusters of solid-laden gel bodies that act as pillars to keep the fracture propped open once the fracturing pressure has been released.

In some embodiments, the solids included in the solids-laden gel bodies may be any proppant material described above. In preferred embodiments, included in the solids-laden gel bodies are fibers. Fibers may exist partially inside of the solids-laden gel body and partially outside. This may help suspend the solids-laden gel bodies within the carrier fluid and can also act to keep separate solids-laden gel bodies from merging into single, larger gel bodies. In some embodiments the fibers may be degradable.

Gel bodies suitable for use in the present invention include those described in U.S. Patent Application Publication No. 2010/0089581, the entire disclosure of which is hereby incorporated by reference. In addition, the super-absorbent polymer discussed in U.S. Patent Application Publication No. 2011/0067868, the entire disclosure of which is hereby incorporated by reference, may also be suitable for use as gel bodies in the present invention. One of skill in the art will recognize that some of the gel bodies may be designed to degrade once the fracture closes, while other gel bodies may be more resistant to such degradation long after the closing of the fracture. In some instances, the gel used to form the solids-laden gel bodies preferably does not degrade under the conditions in the subterranean formation.

By way of example, gel bodies of the present invention may be formed from swellable particulates composed of swellable organic material, such as a polymer or a salt of a polymeric material. Typical examples of polymeric materials include, but are not limited to, cross-linked polyacrylamide, cross-linked polyacrylate, cross-linked copolymers of acrylamide and acrylate monomers, starch grafted with acrylonitrile and acrylate, cross-linked polymers of two or more of allylsulfonate, 2-acrylamido-2-methyl-1-propanesulfonic acid, 3-allyloxy-2-hydroxy-1-propanesulfonic acid, acrylamide, acrylic acid monomers, and any combination thereof in any proportion. Typical examples of suitable salts of polymeric material include, but are not limited to, salts of carboxyalkyl starch, salts of carboxymethyl starch, salts of carboxymethyl cellulose, salts of cross-linked carboxyalkyl polysaccharide, starch grafted with acrylonitrile and acrylate monomers, and any combination thereof in any proportion. The specific features of the swellable particulate may be chosen or modified to provide a proppant pack with desired permeability while maintaining adequate propping and filtering capability. These swellable particulates are capable of swelling upon contact with a swelling agent. The swelling agent for the swellable particulate can be any agent that causes the swellable particulate to swell via absorption of the swelling agent. In a preferred embodiment, the swellable particulate is "water swellable," meaning that the swelling agent is water. Suitable sources of water for use as the swelling agent include, but are not limited to, fresh water, brackish water, sea water, brine, and any combination thereof in any proportion. In another embodiment of the invention, the swellable particulate is "oil swellable," meaning that the swelling agent for the swellable particulate is an organic fluid. Examples of organic swelling agents include, but are not limited to, diesel, kerosene, crude oil, and any combination thereof in any proportion.

Also by way of example, degradable gel bodies of the present invention may be formed from super-absorbent polymers. Suitable such super-absorbent polymers include polyacrylamide, crosslinked poly(meth)acrylate, and non-soluble acrylic polymers.

In some embodiments of the present invention, the proppant particulates, including those used in the solids-laden gel bodies, are coated with a binding fluid. Binding fluids used in the present invention exhibit a sticky or tacky character. As used herein, the term "tacky," in all of its forms, generally refers to a substance having a nature such that it is (or may be activated to become) somewhat sticky to the touch. Among other things, the binding fluid is used to adhere proppant particulate(s) together to facilitate the formation of proppant aggregate(s).

Suitable consolidating agents may include, but are not limited to, non-aqueous tackifying agents, aqueous tackifying agents, emulsified tackifying agents, silyl-modified polyamide compounds, polysiloxanes, resins, crosslinkable aqueous polymer compositions, polymerizable organic monomer compositions, consolidating agent emulsions, zeta-potential modifying aggregating compositions, and binders. Combinations and/or derivatives of these also may be suitable. Nonlimiting examples of suitable non-aqueous tackifying agents may be found in U.S. Pat. Nos. 5,853,048; 5,839,510; and 5,833,000 as well as U.S. Patent Application Publication Nos. 2007/0131425 and 2007/0131422 the entire disclosures of which are herein incorporated by reference. Nonlimiting examples of suitable aqueous tackifying agents may be found in U.S. Pat. Nos. 5,249,627 and 4,670,501 as well as U.S. Patent Application Publication Nos. 2005/0277554 and 2005/0274517, the entire disclosures of which are herein incorporated by reference. Nonlimiting examples of suitable crosslinkable aqueous polymer compositions may be found in U.S. Patent Application Publication Nos. 2010/0160187 and 2011/0030950 the entire disclosures of which are herein incorporated by reference. Nonlimiting examples of suitable silyl-modified polyamide compounds may be found in U.S. Pat. No. 6,439,309 the entire disclosure of which is herein incorporated by reference. Nonlimiting examples of suitable resins may be found in U.S. Pat. Nos. 7,673,686; 7,153,575; 6,677,426; 6,582,819; 6,311,773; and 4,585,064 as well as U.S. Patent Application Publication Nos. 2010/0212898 and 2008/0006405, the entire disclosures of which are herein incorporated by reference. Nonlimiting examples of suitable polymerizable organic monomer compositions may be found in U.S. Pat. No. 7,819,192, the entire disclosure of which is herein incorporated by reference. Nonlimiting examples of suitable consolidating agent emulsions may be found in U.S. Patent Application Publication No. 2007/0289781, the entire disclosure of which is herein incorporated by reference. Nonlimiting examples of suitable zeta-potential modifying aggregating compositions may be found in U.S. Pat. Nos. 7,956,017 and 7,392,847, the entire disclosures of which are herein incorporated by reference. Nonlimiting examples of suitable silicon-based resins may be found in Application Publication Nos. 2011/0098394, 2010/0280210, 2010/0179281, and 2010/0212898 the entire disclosures of which are herein incorporated by reference. Nonlimiting examples of suitable binders may be found in U.S. Pat. Nos. 8,003,579; 7,825,074; and 6,287,639 as well as U.S. Patent Application Publication No. 2011/0039737, the entire disclosures of which are herein incorporated by reference. It is within the ability of one skilled in the art, with the benefit of this disclosure, to determine the type and amount of consolidating agent to include in the methods of the present invention to achieve the desired results.

In the embodiments of the present invention, a shear-thickening fluid is used as part of a treatment fluid to transport proppant or proppant aggregates. The shear-thickening fluids act to protect the proppant or proppant aggregates as they pass through high-shear or high impact areas downhole (e.g., when encountering elbows, restrictions, perforations, or the like). The shear-thickening fluid minimizes proppant aggregate dispersion into smaller bodies due to shear force or stress and, thus, increases the porosity of a propped fracture and the performance of a subterranean formation. Under low shear conditions (e.g., static conditions within the fracture), the proppant particulates are not hindered from agglomerating into proppant aggregates due to the reduced viscosity of the shear-thickening fluid.

Shear-thickening fluids are capable of spontaneously changing from a relatively nonviscous liquid fluid to a cohesive, viscous mass when subjected to a critical rate of shear force or stress, referred to herein as "deformation." When the shear force or stress is reduced below the critical rate, the cohesive, viscous mass returns to its original liquid state. In one embodiment of the present invention, the shear-thickening fluid comprises an aqueous fluid, a polyvinyl alcohol, and borate ions. In some embodiments, the concentration of polyvinyl alcohol is less than about 25%, about 22%, about 20%, about 18%, about 16%, about 15%, about 14%, about 13%, about 12%, about 11%, or about 10% by weight of the shear-thickening fluid. The concentration of borate ions is less than about 7%, about 6.5%, about 6%, about 5.5%, about 5%, about 4.5%, about 4%, about 3.5%, or about 3% by weight of the shear-thickening fluid. The particular amount of polyvinyl alcohol and borate ions will depend on the properties of the aqueous fluid and the subterranean formation in order to achieve the desired shear-thickening properties at the critical shear force or stress rate. In a preferred embodiment, the polyvinyl alcohol has a molecular weight of from about 10,000 to about 300,000.

In another embodiment, the shear-thickening fluid is a mixture of an aqueous fluid, a viscoelastic surfactant, a rheology enhancer, and a shear activation additive. The viscoelastic surfactant may include any charge or a combination of charges, for example, a zwitterionic surfactant, an amphoteric surfactant, an anionic surfactant, a cationic surfactant, and any combinations thereof. The viscoelastic surfactants may generally comprise any viscoelastic surfactant known in the art, or any combination thereof. As used herein, the term "viscoelastic surfactant" refers to surfactants that impart or are capable of imparting viscoelastic behavior to a fluid due, at least in part, to the association of surfactant molecules to form viscosifying micelles. As used herein, the term "viscosifying micelle" includes structures that minimize the contact between the lyophobic ("solvent-repelling") portion of a surfactant molecule and the solvent that, under certain conditions (e.g., concentration, ionic strength of the fluid, etc.) are capable of, inter alia, imparting increased viscosity to a particular fluid and/or forming a gel. The viscoelastic surfactants may comprise any number of different compounds, including methyl ester sulfonates (e.g., as described in U.S. Pat. No. 7,299,874, entitled "Viscoelastic Surfactant Fluids and Associated Methods;" U.S. Pat. No. 7,159,659, entitled "Viscoelastic Surfactant Fluids and Associated Acidizing Methods;" U.S. Pat. No. 7,303,019, entitled "Viscoelastic Surfactant Fluids and Associated Diverting Methods;" and U.S. Patent Pub. 2006/0183646, entitled "Viscoelastic Surfactant Fluids and Associated Methods;" the entirety of these disclosures is hereby incorporated by reference. In addition to methyl ester sulfonates, the viscoelastic surfactants may comprise, for example, hydrolyzed keratin (e.g., as described in U.S. Pat. No. 6,734,146, entitled "Foamed fracturing fluids, additives and methods of fracturing subterranean zones," the entire disclosure of which is incorporated herein by reference). Still other useful viscoelastic surfactants may comprise: sulfosuccinates, taurates, amine oxides, ethoxylated amides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, alkylamidobetaines (e.g., cocoamidopropyl betaine), quaternary ammonium compounds (e.g., trimethyltallowammonium chloride, trimethylcocoammonium chloride), derivatives thereof, and combinations thereof. The term "derivative" is defined herein any compound that is made from one of the listed compounds, for example, by replacing one atom in one of the listed compounds with another atom or group of atoms, ionizing one of the listed compounds, or creating a salt of one of the listed compounds. In addition, U.S. Pat. No. 7,939,471, entitled "Subterranean Treatment Fluids Comprising Viscoelastic Surfactant Gels," the entire disclosure of which is hereby incorporated by reference, provides additional examples of suitable viscoelastic surfactants.

Along with the viscoelastic surfactant, the rheology enhancer may include, for example, a polyvinyl ester, a polyvinyl acetate, a polyacrylate, a polyvinyl alcohol, an aromatic sulfonate, mutual solvents, ABA copolymers, or any combination thereof. The shear activation additive is a base. In some cases, the base may exhibit delayed activation properties, such as being encapsulated, so that the shear activation additive only interacts with the viscoelastic surfactant after a period of time.

In still other embodiments of the present invention, the shear-thickening fluid is prepared with an amphiphilic polymer, hydrophilic particles, and polyethyleneoxide. In preferred embodiments, the hydrophilic particles are synthetic clay of the type laponite, the amphiphilic polymer is a synthetic polymer and/or a hydrophobically modified biopolymer, and the ratio for their respective concentrations of hydrophilic particles to amphiphilic polymer is between 3.5 and 3.7. One of ordinary skill in the art, with the benefit of this disclosure, will recognize the proper concentration ratio required for the desired application. Examples of suitable such shear-thickening fluids can be found in U.S. Pat. Pub. No. 2010/0071893, the entire disclosure of which is hereby incorporated by reference.

In some embodiments, the present invention provides a method comprising introducing a solids-free fracturing fluid into a subterranean formation at a rate sufficient to enhance or create at least one fracture therein. Then, introducing a treatment fluid comprising a carrier fluid (that is preferably shear-thinning) and a shear-thickening fluid. The shear-thickening fluid comprises proppant, proppant aggregates, solids-laden gel bodies, or a combination thereof. As used herein the group of "proppant, proppant aggregates, and solids-laden gel bodies" may be referred to a "propping material." In some embodiments the treatment fluid may further comprise solids-free gel bodies; these solids-free gel bodies may be present either in the carrier fluid or the shear-thickening fluid. Generally, once the shear-thickening fluid is placed into the fracture and a bed of propping material is placed, the carrier fluid is broken and removed from the fracture.

Degradable solids-free gel bodies may be included in the treatment fluid to increase the voids or channels between proppant aggregates after the fracture closes. Once placed within a fracture, the degradable components are allowed to break down into a liquid phase and are then removed from the propped fracture, leaving behind proppant aggregates that act as pillars or masses to keep the fracture from closing while allowing voids and channels to form surrounding the proppant aggregates. Preferably, the pressure within the subterranean formation is allowed to reduce below the pressure sufficient to create or enhance fractures within the subterranean formation after the gel bodies are placed and before the solids-free gel bodies degrade.

Solids-free gel bodies are in a form such as a blob, fragment, or chunk and are designed to degrade over time in the treatment fluid. Degradable proppant particulates, preferably fibers, may be included within the solids-free gel bodies and may exist partially inside of the gel body and partially outside. This may help suspend the gel bodies within the treatment fluid and may also act to keep the gel bodies from merging into single, larger gel bodies.

The amount of degradable solids-free gel bodies is generally selected to effectively surround the proppant aggregates. Thus, in preferred embodiments, the degradable solids-free gel bodies are present in greater quantity than the proppant aggregates such that the proppant aggregates are spaced apart from one another within a fracture, forming high porosity propped fractures. As used herein, the term "high porosity fracture" refers to a proppant fracture having a porosity greater than about 40%.

Gel bodies suitable for use in the present invention include any of those previously listed in reference to solids-laden gel bodies.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:
1. A method comprising:
introducing a solids-free fracturing fluid into a subterranean formation at a rate sufficient to enhance or create at least one fracture therein;
providing a treatment fluid comprising a shear-thinning carrier fluid and a shear-thickening fluid, wherein the shear-thinning fluid has a viscosity that decreases upon shear strain, wherein the shear-thickening fluid comprises an aqueous fluid, a polyvinyl fluid present in the range of between about 10% and about 25% by weight of the shear-thickening fluid, and a borate ion present in the range of between about 3% and about 7%, by weight of the shear-thickening fluid, and herein the shear-thickening fluid comprises a propping material selected from the group consisting of: proppant, proppant aggregates, solids-free gel bodies, and combinations thereof;
introducing the treatment fluid into the fracture; and, forming a bed of propping material within the fracture.

2. The method of claim 1, wherein the treatment fluid further comprises solids-free gel bodies in the shear-thinning carrier fluid.

3. The method of claim 1, wherein the proppant aggregates comprise proppant that is coated with a binding fluid selected from the group consisting of: non-aqueous tackifying agent, aqueous tackifying agent, emulsified tackifying agent, silyl-modified polyamide compound, resin, crosslinkable aqueous polymer composition, polymerizable organic monomer composition, consolidating agent emulsion, zeta-potential modifying aggregating composition, silicon-based resin, binder, and any combination thereof.

4. A method comprising:
introducing a solids-free fracturing fluid into a subterranean formation at a rate sufficient to enhance or create at least one fracture therein;
providing a treatment fluid comprising a shear-thinning carrier fluid and a shear-thickening fluid,
wherein the shear-thinning fluid has a viscosity that decreases upon shear strain,
wherein the shear-thinning fluid comprises solids-free gel bodies, and
wherein the shear-thickening fluid comprises a propping material selected from the group consisting of: proppant, proppant aggregates, solids-free gel bodies, and combinations thereof;
introducing a treatment fluid into the fracture; and,
forming a bed of propping material within the fracture.

5. The method of claim 4, wherein the shear-thickening fluid comprises an aqueous fluid, a polyvinyl alcohol, and a borate ion.

6. The method of claim 4 wherein the solids-free gel bodies comprise a swellable polymer selected from the group consisting of a cross-linked polyacrylamide, a crosslinked poly (meth)acrylate, a cross-linked polyacrylate, a cross-linked copolymer of acrylamide and acrylate monomer, a starch grafted with acrylonitrile and acrylate, a cross-linked polymer of two or more of allylsulfonates, 2-acrylamido-2-methyl-1-propanesulfonic acid, 3-allyloxy-2-hydroxy-1-propanesulfonic acid, acrylamide, an acrylic acid monomer, a non-soluble acrylic polymer, and any combination thereof.

7. The method of claim 4 wherein the solids-free gel bodies comprise a salt selected from the group consisting of a salt of carboxyalkyl starch, a salt of carboxymethyl starch, a salt of carboxymethyl cellulose, a salt of cross-linked carboxyalkyl polysaccharide, a starch grafted with acrylonitrile and acrylate monomers, and any combination thereof.

8. The method of claim 4 wherein the proppant particulates are elected from the group consisting of solids-laden gel bodies, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, lightweight particulates, microsphere plastic beads, ceramic microspheres, glass microspheres, manmade fibers, cement, fly ash, carbon black powder, and combinations thereof.

9. The method of claim 4, wherein the proppants are coated with a binding fluid selected from the group consisting of non-aqueous tackifying agent, aqueous tackifying agent, emulsified tackifying agent, silyl-modified polyamide compound, resin, crosslinkable aqueous polymer composition, polymerizable organic monomer composition, consolidating agent emulsion, zeta-potential modifying aggregating composition, silicon-based resin, binder, and any combination thereof.

10. The method of claim 4, wherein the shear-thickening fluid comprises an amphiphilic polymer, a hydrophilic particle, and polyethylenoxide.

11. The method of claim 4, wherein the shear-thickening fluid comprises an aqueous fluid, a viscoelastic surfactant, a theology enhancer, and a shear activation additive.

12. The method of claim 11, wherein the theology enhancer is selected from the group consisting of a polyvinyl ester, a polyvinyl acetate, a polyacrylate, a polyvinyl alcohol, an aromatic sulfonate, a mutual solvent, an ABA copolymer, and any combination thereof.

13. The method of claim 11, wherein the shear activation additive is a base.

14. A method comprising:
introducing a solids-free fracturing fluid into a subterranean formation at a rate sufficient to enhance or create at least one fracture therein;
providing a treatment fluid comprising a shear-thinning carrier fluid and a shear-thickening fluid.
wherein the shear-thinning fluid has a viscosity that decreases upon shear strain,
wherein the shear-thickening fluid comprises an aqueous fluid, a polyvinyl alcohol, a borate ion, and a propping material selected from the group consisting of: proppant, proppant aggregates, solids free gel bodies, and combinations thereof, and
wherein the polyvinyl alcohol has a molecular weight in the range of from about 10,000 to about 300,000;
introducing the treatment fluid into the fracture; and,
forming a bed of propping material within the fracture.

* * * * *